(12) United States Patent
Gao

(10) Patent No.: US 8,060,733 B2
(45) Date of Patent: Nov. 15, 2011

(54) APPARATUS FOR DISPLAYING BIOS POST CODE AND METHOD THEREOF

(75) Inventor: Feng Gao, Jung-He (TW)

(73) Assignees: MSI Electronic (Kun Shan) Co., Ltd,; Micro-Star Int'l Co., Limited

( * ) Notice: Subject to any disclaimer, the term of this patent is extended or adjusted under 35 U.S.C. 154(b) by 623 days.

(21) Appl. No.: 12/191,760

(22) Filed: Aug. 14, 2008

(65) Prior Publication Data

US 2009/0259888 A1    Oct. 15, 2009

(30) Foreign Application Priority Data

Apr. 10, 2008   (TW) ................ 97113102 A

(51) Int. Cl.
G06F 9/24 (2006.01)
(52) U.S. Cl. ............... 713/1; 713/2; 714/36; 714/57; 710/104; 710/305
(58) Field of Classification Search ........... 713/1, 2; 714/36, 57; 710/104, 305
See application file for complete search history.

(56) References Cited

U.S. PATENT DOCUMENTS

| | | | | |
|---|---|---|---|---|
| 7,127,531 B2 * | 10/2006 | Biggs et al. | ................. | 710/5 |
| 7,486,502 B2 * | 2/2009 | Yu | ................. | 710/1 |
| 2006/0236087 A1 * | 10/2006 | Ha | ................. | 713/2 |
| 2007/0168746 A1 * | 7/2007 | Righi et al. | ................. | 714/38 |

* cited by examiner

*Primary Examiner* — Thuan Du
(74) *Attorney, Agent, or Firm* — Apex Juris, pllc; Tracy M. Heims

(57) ABSTRACT

An apparatus for displaying a basic input output system (BIOS) power-on self-test (POST) code and a method thereof are provided. The apparatus includes a BIOS, a conversion module, and an output module. The BIOS is used for generating a POST code. The POST code is transmitted via a low pin count (LPC) interface. The conversion module receives the POST code and converts the POST code into a system management bus (SMBus) format. The output module is used for receiving and outputting the POST code transmitted by the conversion module. The output module is an SMBus interface.

11 Claims, 5 Drawing Sheets

APPARATUS FOR DISPLAYING BIOS POST CODE AND METHOD THEREOF

CROSS-REFERENCES TO RELATED APPLICATIONS

This non-provisional application claims priority under 35 U.S.C. §119(a) of Patent Application No(s). 97113102 filed in Taiwan, R.O.C. on Apr. 10, 2008, the entire contents of which are hereby incorporated by reference.

BACKGROUND OF THE INVENTION

1. Field of Invention

The present invention relates to an apparatus for displaying a power-on self-test (POST) code and a method thereof, and more particularly to an apparatus for displaying a basic input output system (BIOS) POST code and a method thereof.

2. Related Art

When an apparatus such as a computer system is started or reset, a basic input output system (BIOS) performs a power-on self-test (POST) on the hardware. The POST is a test performed by the computer system for the purpose of normal operation. It first tests whether elements of each portion are in order or whether a particular apparatus failed to be properly installed before an operating system is loaded. After the POST is performed, a POST code is generated if an abnormal situation occurs in the computer system. The POST code identifies non-functional hardware, so the problem can be overcome.

In older systems, the POST code is transmitted to a PCI bus by a system main chip, and then decoded and displayed by a device connected to the PCI bus. Nowadays, the POST code is generally transmitted to a low pin count (LPC) interface bus by the system main chip, and then received and displayed by an external inspection device.

When the POST code is transmitted via an LPC interface, a connection port needs to be reserved on the motherboard of the computer system, so as to connect the inspection device and receive the POST code. As an LPC interface has seven signal lines, a space consisting of seven pins must be occupied. However, with the increasing progress of notebook technology, requirements of low weight and small width make the space in the notebooks fairly valuable. Therefore, the connection port to be reserved for the LPC interface occupies too much space on the motherboard.

Moreover, in the prior art, in order to connect the inspection device to the connection port of the LPC interface on the motherboard to receive and display the POST code, the computer's case must be disassembled. This is very inconvenient, and the procedure becomes more difficult.

Therefore, a method of transmitting the POST code through a USB port is proposed in the prior art. However, an USB interface has to be initialized by the computer system in order to operate normally, and as a result the USB interface cannot work normally before a USB device is initialized by the computer system. If an abnormal situation occurs in the computer system at this point, the POST code cannot be transmitted.

Further, a method for displaying the POST code through LEDs on a notebook computer system is also proposed in the prior art. Built-in LEDs such as keyboard lights, power lights, and hard disk lights of a notebook are used to represent corresponding POST codes using an LED combination display. However, such a method requires that users know in advance the POST codes indicated by various combinations of the LED lights. Therefore, the users need to be trained first, or must look up corresponding tables, which takes time.

Therefore, the problem to be solved is how to display the BIOS POST code in the computer system.

SUMMARY OF THE INVENTION

Accordingly, the present invention is directed to an apparatus for displaying a basic input output system (BIOS) power-on self-test (POST) code and a method thereof. Unlike the low pin count (LPC) interface in the prior art, the apparatus or method provided in the present invention does not need to occupy a plurality of pins, thus saving configuration space. Furthermore, since the POST code can be displayed without disassembling the case of the computer system, this method is far more convenient.

An apparatus for displaying a BIOS POST code is applicable to a computer system. The apparatus includes a BIOS, a conversion module, and an output module. The BIOS is used for generating a POST code. The POST code is transmitted via an LPC interface. The conversion module receives the POST code and converts the POST code into a system management bus (SMBus) format. The output module is used for receiving and outputting the POST code transmitted by the conversion module. The output module is an SMBus interface.

A method for displaying a BIOS POST code is also provided. The method includes the steps of: generating a POST code by means of a BIOS; transmitting the POST code via an LPC interface; converting the POST code into an SMBus format; and providing an output module of an SMBus interface for receiving and outputting the POST code.

Embodiments of the present invention and efficacies thereof are described below with the accompanying drawings.

BRIEF DESCRIPTION OF THE DRAWINGS

The present invention will become more fully understood from the detailed description given herein below for illustration only, and thus do not limit the present invention, wherein.

DETAILED DESCRIPTION OF THE INVENTION

Figure 1:
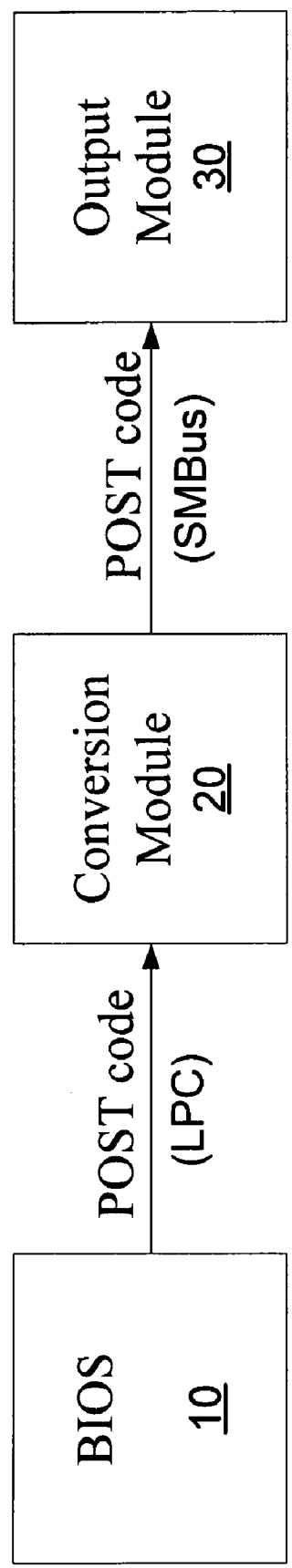
FIG. 1 is a schematic view of an apparatus for displaying a BIOS POST code according to a first embodiment.

FIG. 1 is a schematic view of an apparatus for displaying a basic input output system (BIOS) power-on self-test (POST) code according to a first embodiment. The apparatus provided by the present invention is applicable to a computer system, and includes a BIOS 10, a conversion module 20, and an output module 30.

A BIOS on a computer system performs inspection and initialization on hardware devices, and respectively outputs POST codes according to operational stages of the inspection program. The BIOS then transmits the POST codes to certain system buses or interfaces according to conditions of the hardware devices in the system.

Therefore, the BIOS 10 provided in the present invention is used for generating a POST code. The POST code is transmitted via a low pin count (LPC) interface.

The POST code generated by the BIOS is transmitted to the conversion module 20 via an LPC interface. On receiving the POST code, the conversion module 20 converts the POST code into a system management bus (SMBus) format from an original LPC format. The conversion module 20 can be a built-in keyboard controller (KBC) in an ordinary computer system. The KBC has many functions, such as controlling the keyboard, controlling the screen brightness, and controlling the touch pad. In addition, the KBC itself has the function of converting the LPC format into the SMBus format. Therefore, in the present invention, the KBC may serve as the conversion module 20 for converting the POST code from the LPC format into the SMBus format.

The output module 30 is used for receiving and outputting the POST code transmitted by the conversion module 20. Since the conversion module 20 has converted the POST code into the SMBus format, the interface type of the output module 30 belongs to the SMBus interface.

As only two or three pins (when no ground signal is reserved, two pins; and when a ground signal is reserved, three pins) need to be reserved for the SMBus interface, the configuration space that needs to be reserved on the motherboard is significantly conserved, compared with the LPC interface which needs seven reserved pins.

The above output module 30 may be a battery connection port of a notebook. The battery connection port is originally built in the notebook, and belongs to the SMBus interface, which is used for transmitting signals related to battery electric quantity and the like. Since the battery connection port of the notebook belongs to the SMBus interface, the built-in battery connection port of the notebook functions as the output module 30 of the present invention. In this manner, no additional connection port needs to be added, nor do additional circuits. Thus, no valuable space on the motherboard is occupied. Further, as the battery connection port receives and outputs the POST code, an external device may read the POST code by simply connecting the battery connection port instead of disassembling the case in the prior art. Therefore, the present invention is convenient in operation.

In addition, the output module 30 may also be an additionally reserved SMBus connection port. At this point, only a space for two or three pins needs to be reserved on the motherboard. Compared with the manner of pin reservation for the LPC interface in the prior art, the apparatus provided by the present invention may reduce the number of the signal lines to 2 or 3. Thus, the configuration space on the motherboard is conserved, and the positioning of the connection port becomes more flexible.

Figure 2:
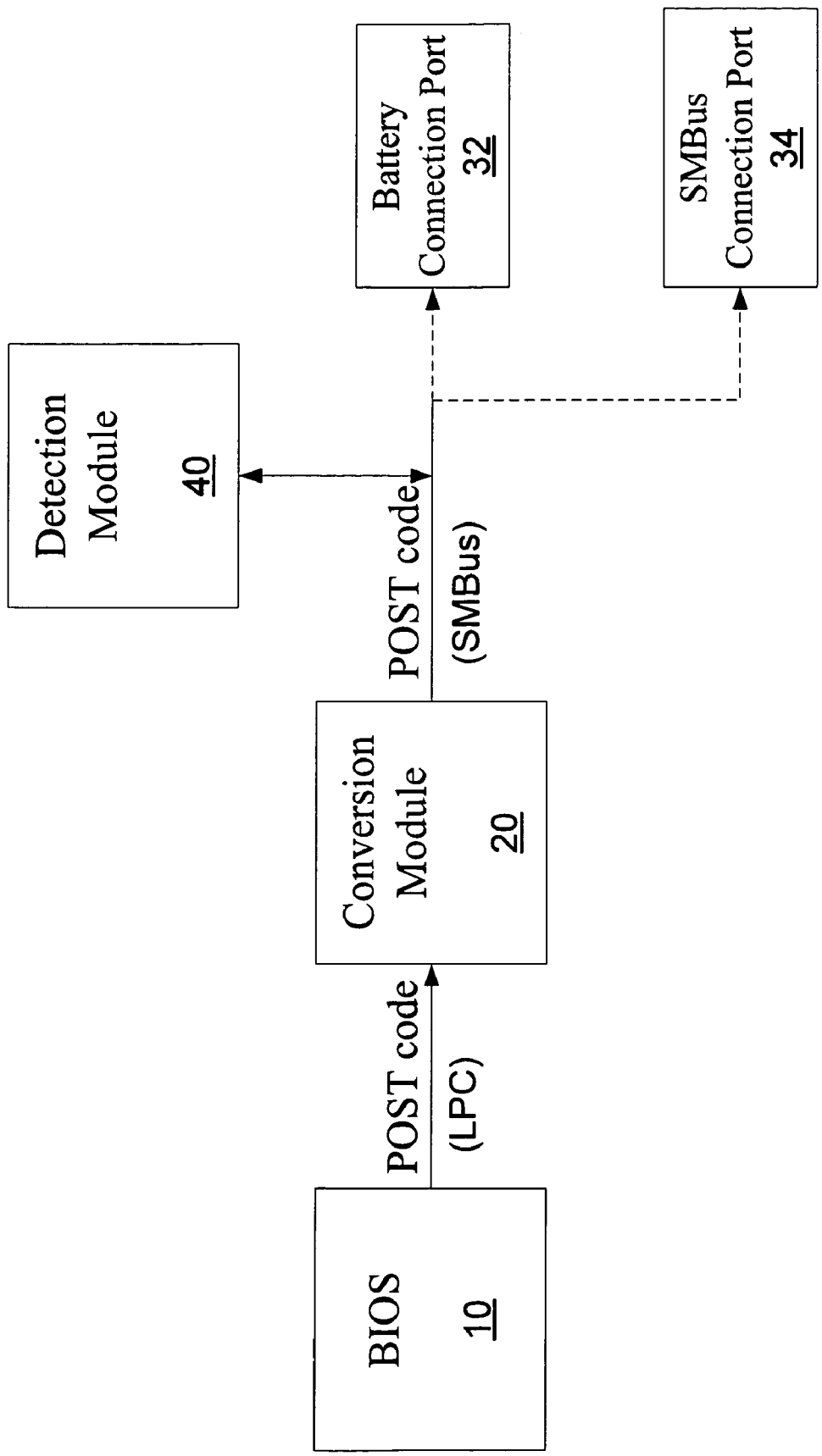
FIG. 2 is a schematic view of an apparatus for displaying a BIOS POST code according to a second embodiment.

FIG. 2 is a schematic view of an apparatus for displaying a BIOS POST code according to a second embodiment. In the second embodiment, the output module 30 may simultaneously include a battery connection port 32 of a notebook and an additionally reserved SMBus connection port 34. In this case, the apparatus for displaying a BIOS POST code further includes a detection module 40.

The detection module 40 detects whether a notebook battery is connected to the battery connection port, and then generates a detection signal. The detection signal may separately indicate the following two situations. If the detection signal indicates that the notebook battery is not connected to the battery connection port 32, the POST code is received and output via the battery connection port 32. In contrast, if the detection signal indicates that the battery of the notebook is connected to the battery connection port 32, the POST code is received and output via the SMBus connection port 34. As indicated by the dotted line in FIG. 2, the POST code is received and output by the battery connection port 32 or the SMBus connection port 34, according to the detection signal of the detection module 40.

The above computer system may be a notebook or a desk-top computer. Since a desk-top computer does not have the battery connection port 32, the output module 30 may be the additionally reserved SMBus connection port 34 when applied to the desk-top computer. At this point, the POST code converted by the conversion module 20 is received and output via the SMBus connection port 34.

Figure 3A:
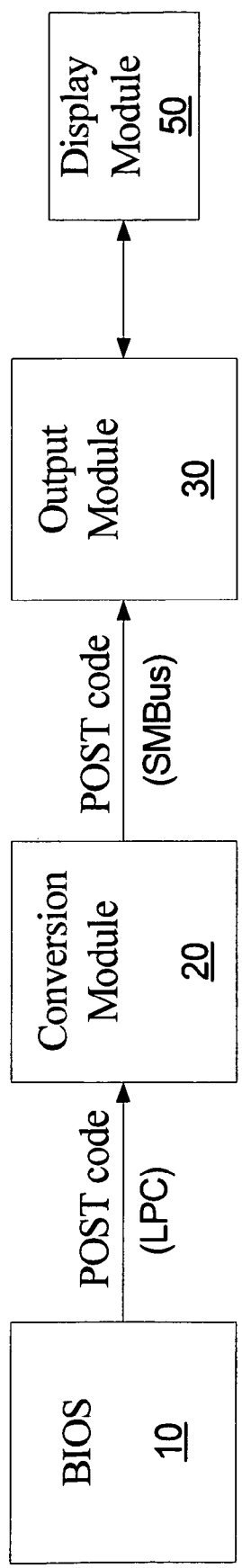
FIG. 3A is a schematic view of an apparatus for displaying a BIOS POST code according to a third embodiment.
Figure 3B:
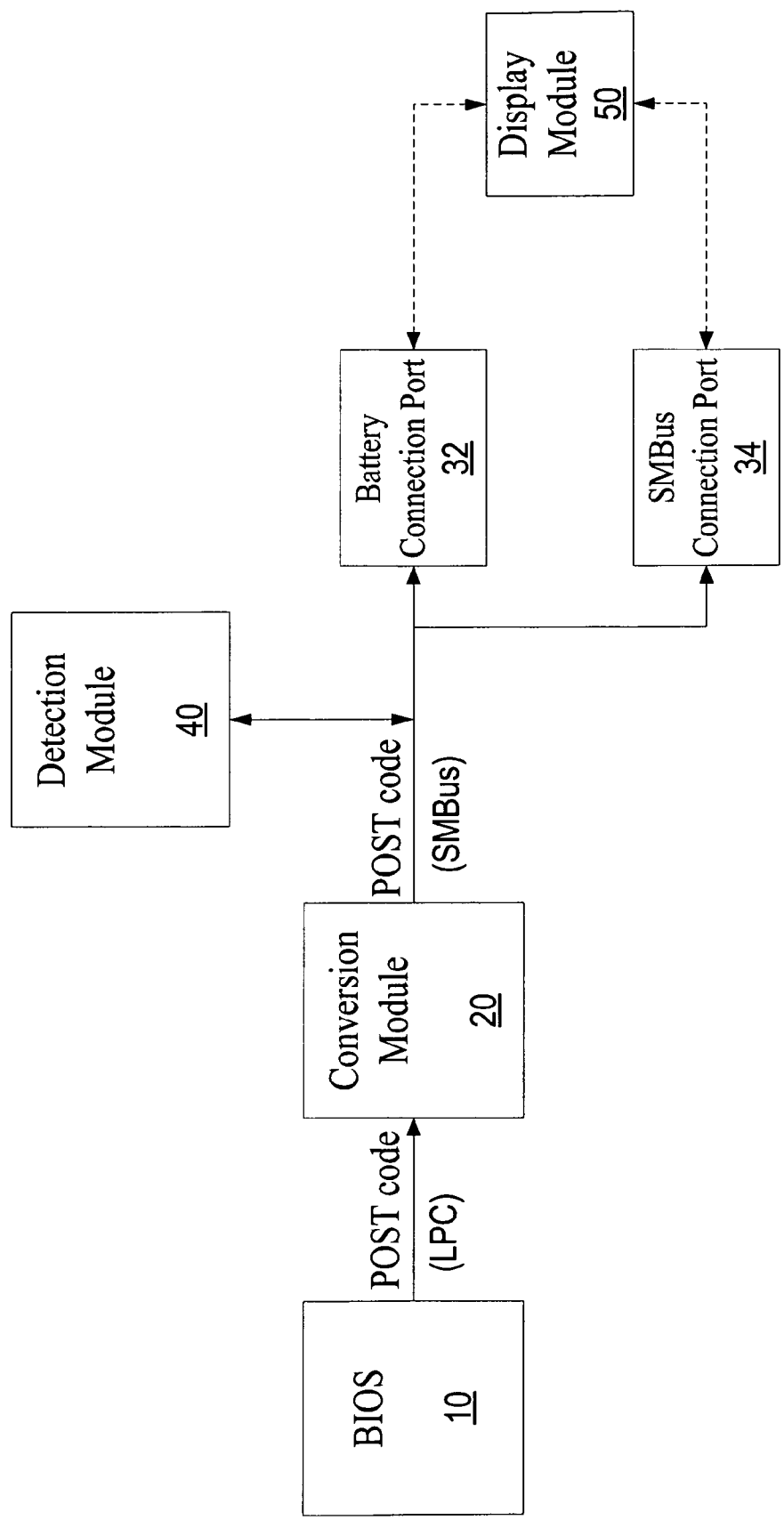
FIG. 3B is a schematic view of an apparatus for displaying a BIOS POST code according to a fourth embodiment.

FIGS. 3A and 3B are schematic views of apparatuses for displaying a BIOS POST code according to a third and a fourth embodiment respectively. Each of the apparatuses further includes a display module 50.

The display module 50 is connected to the output module 30 to display the POST code. When a user needs to read the POST code so as to know the status of the hardware devices of the computer system, the POST code can be displayed after the display module 50 is connected to the output module 30. As the connected output module 30 may be the battery connection port 32 or the SMBus connection port 34, and the interface types of the two ports also belong to the SMBus interface, the display module 50 needs a connection port of the SMBus interface for being connected thereto. As indicated by dotted lines in FIG. 3B, since the POST code is received and output by the battery connection port 32 or the SMBus connection port 34 according to the detection signal, the display module 50 may be connected to the battery connection port 32 or the SMBus connection port 34, for displaying the POST code.

Figure 4:
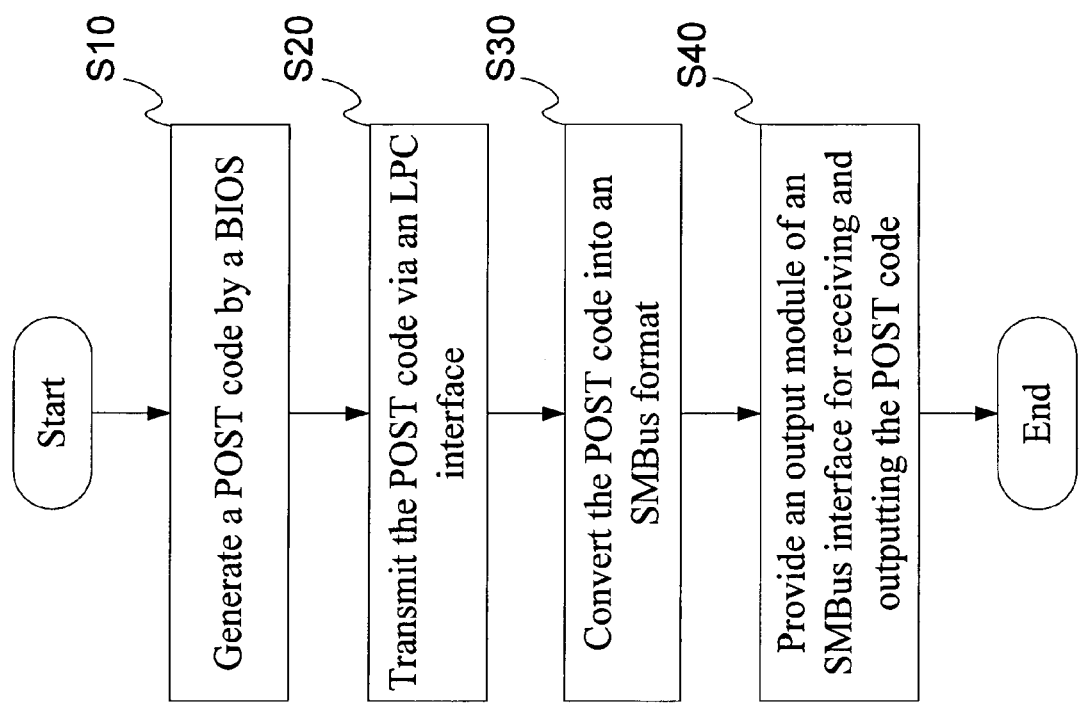
FIG. 4 is a flow chart of a method for displaying a BIOS POST code.

FIG. 4 is a flow chart of a method for displaying a BIOS POST code. The method includes the following steps.

In Step S10, a POST code is generated by a BIOS.

In Step S20, the POST code is transmitted via an LPC interface.

In Step S30, the POST code is converted into an SMBus format.

In Step S40, an output module of an SMBus interface is provided for receiving and outputting the POST code. The output module may be a battery connection port of a notebook or an additionally reserved SMBus connection port.

Meanwhile, the output module may also include a battery connection port of a notebook and an additionally reserved SMBus connection port. In view of this, the method further includes the following step of: detecting whether a battery of the notebook is connected to the battery connection port, and then generating a detection signal. If the detection signal indicates that the battery of the notebook is not connected to the battery connection port, the POST code is received and output via the battery connection port. In contrast, if the detection signal indicates that the battery of the notebook is connected to the battery connection port, the POST code is received and output via the SMBus connection port.

Moreover, in order to allow the POST code to be read by the user, the method may include the steps of: providing a display module connected to the output module, and displaying the POST code. In this manner, the user is able to read the POST code through the display module.

Though the content of the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. An apparatus for displaying a basic input output system (BIOS) power-on self-test (POST) code, applicable to a computer system, the apparatus comprising:
   a BIOS, for generating a POST code, wherein the POST code is transmitted via a low pin count (LPC) interface;
   a conversion module, for receiving the POST code and converting the POST code into a system management bus (SMBus) format; and
   an output module, comprising a battery connection port of a notebook and an additionally reserved SMBus connection port, wherein the additionally reserved SMBus connection port is for receiving and outputting the POST code transmitted by the conversion module; and
   a detection module, for detecting whether a battery of the notebook is connected to the battery connection port, and then generating a detection signal to determine the POST code is received and output via the battery connection port or the additionally reserved SMBus connection port.

2. The apparatus for displaying a BIOS POST code according to claim 1, wherein the output module is a battery connection port of a notebook.

3. The apparatus for displaying a BIOS POST code according to claim 1, wherein if the detection signal indicates that the battery of the notebook is not connected to the battery connection port, the POST code is received and output via the battery connection port.

4. The apparatus for displaying a BIOS POST code according to claim 1, wherein if the detection signal indicates that the battery of the notebook is connected to the battery connection port, the POST code is received and output via the SMBus connection port.

5. The apparatus for displaying a BIOS POST code according to claim 1, wherein the conversion module is a keyboard controller (KBC).

6. The apparatus for displaying a BIOS POST code according to claim 1, wherein the computer system is a notebook.

7. The apparatus for displaying a BIOS POST code according to claim 1, further comprising:
   a display module, connected to the output module, for displaying the POST code.

8. A method for displaying a BIOS POST code, comprising:
   generating a POST code by a BIOS;
   transmitting the POST code via an LPC interface;
   converting the POST code into an SMBus format;
   receiving and outputting the POST code through an output module, wherein the output module comprises a battery connection port of a notebook and an additionally reserved SMBus connection port; and
   before receiving and outputting the POST code through the output module, performing the following step of:
   detecting whether a battery of the notebook is connected to the battery connection port, and then generating a detection signal to determine the POST code is received and output via the battery connection port or the additionally reserved SMBus connection port.

9. The method for displaying a BIOS POST code according to claim 8, wherein if the detection signal indicates that the battery of the notebook is not connected to the battery connection port, the POST code is received and output via the battery connection port.

10. The method for displaying a BIOS POST code according to claim 8, wherein if the detection signal indicates that the battery of the notebook is connected to the battery connection port, the POST code is received and output via the SMBus connection port.

11. The method for displaying a BIOS POST code according to claim 8, further comprising:
    providing a display module connected to the output module; and
    displaying the POST code.

* * * * *